UNITED STATES PATENT OFFICE.

CALEB P. SMITH, OF CLYDE, MISSOURI.

REMEDY FOR HOG-CHOLERA.

SPECIFICATION forming part of Letters Patent No. 317,228, dated May 5, 1885.

Application filed August 19, 1884. (No specimens.)

*To all whom it may concern:*

Be it known that I, CALEB P. SMITH, of Clyde, in the county of Nodaway, in the State of Missouri, have invented a new and Improved Composition or Medicine to be Used for Hog-Cholera; and I do hereby declare that the following is a full and exact description thereof.

My composition consists of the following ingredients, combined in the same relative proportions, viz: pulverized alum, one-third, ($\frac{1}{3}$;) Venetian red, one-third, ($\frac{1}{3}$;) pulverized bloodroot, one-third, ($\frac{1}{3}$.) These ingredients are to be thoroughly mingled by agitation.

To be used as a preventive for cholera, a table-spoonful should be given to hogs in a bucket of food, and in bad cases of the disease the dose may be doubled. This dose should be given two or three times a week during the disease.

For chickens, one spoonful should be given in a quantity of meal.

I claim as my invention—

The herein-described compound, to be used for the treatment and prevention of cholera in hogs and chickens, of pulverized alum, Venetian red, and pulverized bloodroot, in the proportions substantially as specified.

CALEB P. SMITH.

Attest:
P. J. KEELER,
MARY DUFFY.